Patented Apr. 22, 1952

2,593,529

UNITED STATES PATENT OFFICE 2,593,529

ROSIN AMINE ALGAECIDES

Joseph N. Borglin, Wilmington, Del., assignor to Hercules Powder Company, Wilmington, Del., a corporation of Delaware No Drawing. Application May 31, 1950, Serial No. 165,383

9 Claims. (Cl. 167—22)

This invention relates to a process for reducing algae growth in water, particularly in irrigation ditches, canals, and the like.

The addition of toxic organic and inorganic salts to water for the purpose of killing microorganisms therein is well known in the art. The concentration of these salts in the water required for effective control is not uneconomic in recirculated water, but in irrigation ditches, where the toxic material is carried out of the system and is lost, the cost of toxic agents is substantial. The disadvantages of these prior art salts are that they have been water soluble and have been washed away completely in flowing water, or when used in slowly moving or stationary bodies of water at concentrations toxic to algae are toxic also to fish, and to water weeds which aid in maintaining fish life.

In accordance with the present invention, it has been found that algae growth is inhibited in water-carrying systems having walls on which algae normally grow by treatment of the walls of the system with a rosin amine. The walls of the irrigation ditch may be treated with a rosin amine by spraying the walls with an emulsion or a hydrocarbon solution of rosin amine while the water is at a low level or the rosin amine may be added to the water as a solution or dispersion from which the rosin amine will gradually separate and be absorbed by the walls as free rosin amine or an insoluble salt thereof from which toxic amounts of rosin amine are slowly liberated. In being absorbed on the walls in close proximity to potential algae-supporting medium, the amount of rosin amine required is substantially less than would be the case if the rosin amine were in the form of a permanently soluble salt in the water and the entire volume of water had to be maintained at toxicity level. As a result rosin amine is effective in controlling algae growth without poisoning fish and higher plant life at concentrations required to kill algae.

The following examples of the treatment of irrigation ditches are typical.

Example I

The walls of an irrigation ditch at low water were sprayed with a 5% kerosene solution of dehydrogenated rosin amine at such a rate that one gallon was used per 1000 sq. ft. No attempt was made to cover every square foot in the spraying process. Part of the ditch above and below was not treated. After this ditch was then put into use, algae growth upstream from the treated area was normal but there was no algae growth in the treated area or for a distance of about 100 yards downstream from the treated area.

Example II

Another section of the irrigation ditch of Example I was treated similarly using a place of a kerosene solution an emulsion produced by adding a 50% solution of rosin amine in a polyethanoxy rosin amine of U. S. 2,194,429 to water at the rate of 0.5 pound per gallon of water with stirring. The resulting emulsion was sprayed on in the same manner as the kerosene solution of Example I. The results of this treatment were similar to those of Example I.

Example III

Into an irrigation ditch the walls of which had an incipient growth of algae was poured one gallon of the emulsion used in Example II. The flowing water carried the emulsion downstream but the milky emulsion gradually disappeared as it was carried downstream. Within a week the disappearance of algae along the treated section was pronounced. The treatment was effective over a distance of 100 yards. The rosin amine apparently became deposited on the walls of the treated areas, for the growth of algae was inhibited in the treated area for a period of over six weeks.

Example IV

A canal through which water having a combined sulfate and phosphate ion content of 20 parts per million was flowing at the rate of 300 feet per second was treated with dehydrogenated rosin amine acetate at the rate of 10 parts per million for 30 minutes. This treatment killed all of the algae for a distance of seven miles along the canal. A subsequent treatment in the same manner one week later was required in order to cause the rosin amine to toxify the walls of the canal so as to prevent the growth of the algae on the walls. In instances where the subsequent treatment was not carried out, the rosin amine was carried away by the dead algae and a second growth of algae began within a few days. The subsequent treatment of the walls of the canal, on the other hand, was effective for a period of two months.

Example V

A canal through which water containing 15 parts per million combined sulfate and phosphate ion was flowing at the rate of 270 cubic feet per second was treated with 150 pounds dehydrogenated rosin amine acetate over a period of 20 minutes. The algae on the walls of the canal including the bottom were completely killed by this treatment and were washed away. Within three weeks a second growth of algae was apparent, thus requiring a second treatment. Before a second growth of algae could start, the canal was given a third treatment whereby the walls themselves become toxic. This treatment was effective for two months.

*Example VI*

Another section upstream from that of Example V was treated first with hydrogenated rosin amine acetate and then, after the dead algae had been washed away, with an emulsion produced by pouring into water a composition comprising dehydrogenated rosin amine 75 parts, pine oil 5 parts, Triton X-100 (ethylene oxide condensate of an alkylated phenol) 20 parts, and water 2000 parts. The treatment was effective for three months.

The examples show various methods of treating the walls of a canal in which algae normally grow. The treatment of a canal infested with algae will kill the algae present, but the toxic material will be carried away with the dead algae. A subsequent treatment is necessary to treat the walls themselves. The treatment of the walls before algae growth starts is thus preferable. However, in either case actual treatment of the walls substantially uncontaminated by algae gives longer lasting results than treatment only when algae growth is pronounced. When using algaecides of the prior art which do not have a tendency to deposit on the walls, only the shorter lasting type of treatment has been practical, because of the poisoning effect on fish and plant life.

The treatment of the walls of a canal or drainage ditch may be carried out either in the presence or absence of the water normally present in the system. If water is absent, the walls will be sprayed with a water solution of the rosin amine acetate or an aqueous emulsion of the rosin amine or salt thereof having low solubility or a solution of the rosin amine in a cheap organic solvent such as kerosene. The canal or drainage ditch may be treated while water is present, stationary or flowing, by treating the water itself, after algae have been removed, with the rosin amine emulsion or rosin amine acetate so that the water contains 5 to 20 parts per million rosin amine.

Rosin amines are particularly effective because of their tendency to be adsorbed by siliceous, concrete or clay surfaces. It is believed that the water-insoluble nature of the rosin amine is essential to this adsorption. When rosin amine acetate is added to water containing sulfates or phosphates, the rosin amine is insolubilized sufficiently to be adsorbed by the silicates of the clay or concrete walls. Rosin amine acetate has thus been found to give longer lasting effect when the water flowing through the canal contains hard water containing sulfate and/or phosphate ion in an amount of about 5 parts per million or greater. Rosin amine hydrochloride may be substituted for rosin amine acetate but due to its lower solubility it is usually added as a paste or emulsion containing about 20% water. The rosin amine may also be used in the form of other water-soluble salts as the formate, glycolate or chloroacetate. If used as a dispersion the rosin amine may also be used in the form of a dispersible salt of low solubility such as the phosphate, sulfate, oxalate, etc., in which form it will generally be applied as an aqueous emulsion of the insoluble salt. These so-called water-insoluble salts all have a solubility of at least 5 parts per million in water but less than 500 parts per million.

The amount of rosin amine required to kill algae is exceedingly low provided the rosin amine is applied where it is most effective. The amount to be used will vary with the particular system under treatment, the manner of treatment, and the duration desired for effectiveness. The amount is readily determined by experiment using increasing amounts until the amount giving effective control for the desired length of time is reached. An amount sufficient to kill algae, if present, will inhibit algae from starting and such an amount is the economic minimum to be used. Ordinarily about 5 to 10 parts per million rosin amine dispersed in water will kill algae normally present. When rosin amine is adsorbed on the walls the concentration in the water where the algae would normally adhere will also be close to this toxic value.

The term "walls" as used in this specification and claims is intended to cover the surfaces with which the water of the canal, irrigation ditch, or other system comes in contact and thus is intended to include the bottom and sides with no limitation as to distinguishing from the sides or bottom.

The rosin amines useful in the present invention are those amines containing the rosin acid-substituted hydrophenanthrene nucleus and produced by hydrogenation of the corresponding rosin acid nitrile to the primary amine. The nitriles having the rosin acid nucleus are produced by heating a rosin acid with ammonia at about 250 to 350° C. with removal of water formed in the reaction. The reaction is represented by the following series of steps.

$$RCOOH \rightarrow RCN \rightarrow RCH_2NH_2$$

where R is the rosin acid-substituted hydrophenanthrene nucleus. The terminology "rosin amine" is used here as it is generally used in the art to cover an amine of the formula $RCH_2NH_2$ where R is the substituted hydrophenanthrene nucleus of a rosin acid of the formula $RCOOH$. The rosin amines of the present invention include: rosin amine containing chiefly abietylamine and produced by the above reactions from rosin which is rich in abietic acid; hydrorosin amine containing chiefly hydroabietylamine and produced by the above reactions from hydrogenated rosin which is rich in hydroabietic acids; and dehydrogenated or disproportionated rosin containing chiefly dehydroabietylamine and produced by the above reactions from dehydrogenated or disproportionated rosin which is rich in dehydroabietic acid. The above-designated amines are effective even though made by other methods provided their chemical structure is that designated above. Moreover, oxidized rosin amine produced by the above series of reactions from oxidized resin acids such as the oxidized resin acids of the gasoline-insoluble pinewood resins of U. S. 2,193,026 and U. S. 2,221,540 are also effective.

The rosin amine acetate is made by stirring one molecular proportion of acetic acid into a molten rosin amine. The hydrochloride is made by adding one molecular proportion of aqueous hydrochloric acid to a molten rosin amine with stirring. In this latter case a paste is obtained if the product contains 20 to 30% water and this paste is useful in this invention.

Water systems in which algae growth may be prevented by the present process include reservoirs, drainage ditches, irrigation ditches, canals, streams, lakes and the like. Such systems are normally exposed to sunshine. The walls of such systems which have the greatest selective adsorption for rosin amines of this invention and thereby maintain the toxic rosin amine for the greatest length of time in water are walls having complex calcium or magnesium silcates or mixed aluminum silicates on the surface thereof. Walls of concrete or clay are thus most effectively treated and on such walls the rosin amines are selectively adsorbed. This is a characteristic not shared by other amines not having the rosin acid nucleus and as a result rosin amines give a long-lasting toxicity not shared by such other amines.

Since the rosin amines are the toxic-active material of this invention and the rosin amine is the toxic component even in the case where a salt is used, the term "rosin amine," as used in the claims, is intended to include the rosin amine in the form of its salt as well as the free amine itself.

What I claim and desire to protect by Letters Patent is:

1. The method of inhibiting growth of algae in water in a water-carrying system which comprises depositing on the walls of the system normally covered by water and on which algae normally grow a rosin amine in an amount sufficient to kill algae, if present.

2. The method of inhibiting growth of algae in water in a water-carrying system which comprises removing algae on the walls of the system and subsequently depositing on the walls of the system normally covered by water and on which algae normally grow a rosin amine in an amount sufficient to kill algae, if present.

3. The method of inhibiting growth of algae in water in a water-carrying system which comprises depositing on the walls of the system normally covered by water and on which algae normally grow a dispersion of rosin amine in water in which the rosin amine content is at least 5 parts per million.

4. The method of claim 3 in which the dispersion is an emulsion of a rosin amine in water.

5. The method of claim 3 in which the dispersion is an emulsion of a rosin amine with pine oil as a dispersing agent in water.

6. The method of claim 3 in which the water contains at least 5 parts per million of sulfate and phosphate ion and the dispersion is rosin amine hydrochloride in water.

7. The method of claim 3 in which the water contains at least 5 parts per million of sulfate and phosphate ion and the dispersion is rosin amine acetate in water.

8. The method of inhibiting growth of algae in water in a water-carrying system which comprises depositing on the walls of the system normally covered by water and on which algae normally grow a rosin amine in an amount sufficient to kill algae, if present, and subsequently introducing water into the system.

9. The method of inhibiting growth of algae in water in a water-carrying system which comprises depositing on the walls of the system normally covered by water and on which algae normally grow a dispersion of a rosin amine in an amount sufficient to kill algae, if present, and subsequently introducing water into the system.

JOSEPH N. BORGLIN.

REFERENCES CITED

The following references are of record in the file of this patent:

UNITED STATES PATENTS

| Number | Name | Date |
| --- | --- | --- |
| 2,400,863 | Gelfand | May 21, 1946 |
| 2,490,925 | Schertz | Dec. 12, 1949 |